United States Patent [19]

Manohar et al.

[11] Patent Number: 5,999,961

[45] Date of Patent: Dec. 7, 1999

[54] PARALLEL PREFIX OPERATIONS IN ASYNCHRONOUS PROCESSORS

[75] Inventors: Rajit Manohar; Alain J. Martin, both of Pasadena, Calif.

[73] Assignee: California Institute of Technology, Pasadena, Calif.

[21] Appl. No.: 08/929,381

[22] Filed: Sep. 15, 1997

[51] Int. Cl.$^6$ ................................................. G06F 7/38
[52] U.S. Cl. .................... 708/505; 708/503; 708/504; 712/19
[58] Field of Search ..................... 364/736, 716, 364/736.06, 748.15; 395/800, 706, 800.1, 800.19; 708/503, 504, 505, 582, 583, 584; 712/10, 19

[56] References Cited

U.S. PATENT DOCUMENTS

| | | | |
|---|---|---|---|
| 4,551,815 | 11/1985 | Moore et al. | 364/716 |
| 4,757,466 | 7/1988 | Miyaoka et al. | 364/736 |
| 5,083,265 | 1/1992 | Valiant | 395/800 |
| 5,138,704 | 8/1992 | Takashashi et al. | 712/20 |
| 5,327,579 | 7/1994 | Kondo | 395/800 |
| 5,357,237 | 10/1994 | Bearden et al. | 340/146.2 |
| 5,619,437 | 4/1997 | Nagai | 708/210 |
| 5,689,450 | 11/1997 | Kurokawa et al. | 364/736 |
| 5,764,556 | 7/1996 | Stiles | 708/505 |
| 5,768,594 | 7/1995 | Blelloch et al. | 395/706 |
| 5,838,601 | 7/1996 | Yamashita et al. | 708/505 |

Primary Examiner—Joseph E. Palys
Assistant Examiner—Rijue Mai
Attorney, Agent, or Firm—Fish & Richardson P.C.

[57] ABSTRACT

A circuit for performing prefix computation in an asynchronous digital processor by implementing a serial process and a tree process for the same prefix computation in parallel. The first output from either processes is selected and used for the subsequent operation. For a prefix computation with N inputs, an average-case latency of O(loglog N) can be achieved. Buffering can be used for a full-throughout operation.

29 Claims, 7 Drawing Sheets

PARALLEL PREFIX OPERATIONS IN ASYNCHRONOUS PROCESSORS

FIELD OF THE INVENTION

The present invention relates to asynchronous digital processors, and more specifically, to circuit designs and operation of an asynchronous processor for performing prefix operations.

BACKGROUND OF THE INVENTION

Asynchronous circuits allow flexibility in processing operations. Unlike many clocked processing operations which require operations to be done on a worst-case behavior scenario, asynchronous circuits exhibit average case behavior and thus can be optimized for processing data-dependent operations.

One important type of operation in processors is prefix operations in which a result from one operation is needed to perform another operation. A prefix operation computes results $y_1, y_2, \ldots, y_N$ from input channels with input parameters $x_1, x_2, \ldots, x_N$, where $y_k = x_1 \otimes x_2 \otimes \ldots \otimes x_k$ ($1 \leq k \leq N$). This is described in "Parallel Prefix Computation", by Ladner and Fischer, Journal of the Association for Computing Machinery, vol. 27(4), pp. 831–838 (1980), which is incorporated herein by reference.

Prefix operations are used in various applications. For example, the computation of an arbitrary Mealy machine can be made parallel by the prefix operation. F. Thomson Leighton, "Introduction to Parallel Algorithms and Architectures: Arrays, Trees, Hypercubes", Morgan-Kaufmann, 1992. Many different computation processes can be performed with a prefix computation. This includes linear recurrence relations and computing line of sight targets from the ground given their positions. In particular, an efficient adder for binary addition can be constructed with the prefix operation as described herein.

Communication hardware processes (CHP) can be used to represent the prefix operations in an asynchronous circuit. It is assumed that inputs $x_1, x_2, \ldots, x_N$ arrive on input channels $X_1, X_2, \ldots, X_N$, respectively, and that the outputs $y_1, y_2, \ldots, y_N$ are to be respectively produced on output channels $Y_1, Y_2, \ldots, Y_N$. Therefore, the prefix operation can be restated in terms of reading the values $x_i$ ($i=1, 2, \ldots, N$) from the input channels $X_i$, computing the $y_i$ values, and further sending these values on the appropriate output channels.

The above asynchronous prefix operation can be written in a CHP program as follows:

$$*[X_1?x_1, X_2?x_2, \ldots, X_N?x_N; Y_1!x_1, Y_2!(x_1 \otimes x_2), \ldots, Y_N!(x_1 \otimes x_2 \otimes \ldots \otimes x_N)] \quad (1)$$

where notation X?x represents receiving a value on channel X and storing the received value in variable x, notation Y!y represents exporting the value of variable y over channel Y, respectively. A comma "," and a semicolon ";" in Equation (1) indicate parallel and sequential compositions, respectively. The number of $\otimes$-operations is on the order of $N^2$, i.e., $O(N^2)$. This corresponds to $O(N^2)$ circuit elements. The prefix operation as in Equation (1) is inefficient, which will become more apparent in the following description.

For convenience of description, the prefix operation e is assumed to have an identity e in the following discussion. This does not affect the generality of description since one can easily augment $\otimes$ to include an identity and use this operator instead of $\otimes$ to perform the desired computation, or a special case of the construction when it is known that one of the inputs is e, as is known in the art.

One prior-art solution to the above prefix operation is a "tree" process. This is illustrated in FIGS. 1a and 1b. It is assumed that a circuit can be constructed to perform $a_1 \otimes a_2 \otimes \ldots \otimes a_m$ for $m=\lfloor N/2 \rfloor$ and $m=\lceil N/2 \rceil$. A plurality of such circuits can be used to perform $x_1 \otimes x_2 \otimes \ldots \otimes x_N$ by adding a single process that reads in the output of two stages and performs a single $\otimes$ operation since the operation is associative. This process is shown as "UP" process 102 in FIG. 1a, in which two inputs on channels L and R are read and a desired output is generated on channel U:

$$\text{UP}(L, R, U) = *[L?x, R?y; U!(x \otimes y)]. \quad (2)$$

The value of $x_1 \otimes x_2 \otimes \ldots \otimes x_N$ can be computed using a tree of these UP processes.

For any input $x_k$, a prefix $x_1 \otimes x_2 \otimes \ldots \otimes x_{k-1}$ is needed to compute the output $y_k$. The tree in FIG. 1a shows that an input to UP at a particular node is the prefix of the inputs at the leaves of the left and right subtree of the node. The prefix required by the first (leftmost) node of the right subtree can be computed if the prefix required by the first node of the left subtree is known.

If the prefix can be obtained on another input channel V, the UP process then can be augmented to send the appropriate subtree prefixes back down the tree:

$$\text{UP}(L, R, U, V, Ld, Rd) = *[L?x, R?y; U!(x \otimes y); V?p; Ld!p, Rd!(p \otimes x)] \quad (3)$$

Channels Ld and Rd provide exactly the inputs needed by the V channel of the children of a particular UP process. Therefore, this collection of processes can perform the prefix operation by providing an input to the root of the prefix computation tree, reading the inputs and producing the final outputs.

The V channel at the root of the tree requires a null prefix, which is the identity e. The output channel U of the root is not used by any other process. The root process can be simplified as:

$$\text{ROOT}(L, R, Ld, Rd) = *[L?x, R?y; Ld!e, Rd!x] \quad (4)$$

where e is the identity of $\otimes$. The leaves of the prefix computation tree read the inputs and the corresponding prefix from the tree, and produce the appropriate output. A LEAF process can be written as:

$$\text{LEAF}(X, U, V, Y) = *[X?x; U!x; V?y; Y!(y \otimes x)] \quad (5)$$

FIG. 1b shows a complete solution for the prefix operation for N=4. Since each node in the tree has a constant number of $\otimes$ computations and there are O(N) bounded fanin nodes in the tree, the number of $\otimes$-computation circuits in the tree is O(N). The depth of the tree is O(log N), the latency and cycle time of this tree process is O(log N).

The above-described tree process can be split into two parts that execute in parallel by sharing the variable x. For example, a local channel C can be added to copy the value of x in the following UP process:

$$\text{UP}(L, R, U, V, Ld, Rd) = *[L?x, R?y; U!(x \otimes y), C!x] * [C?c, V?p; Ld!p, Rd!(p \otimes c)] = \text{UP2}(L, R, U, C) \| \text{UP2}(V, C, Rd, Ld) \quad (6)$$

where $\|$ represents parallel composition and UP2 is defined as:

$$\text{UP2}(A, B, C, D) = *[A?x, B?y; C!(x \otimes y), D!x] \quad (7)$$

Similarly, the LEAF process can be written as:

$$\text{LEAF}(X, U, V, Y) = *[X?x; U!x, C!x] \| *[C?c, V?y; Y!(y \otimes c)] \quad (8)$$

Using a technique described by Martin, a prefix operation with the tree process can be implemented by using handshaking protocols to replace communications on channels and an encoding technique for making the circuits less sensitive to the delay of arrival of a prefix. See, Martin, "Asynchronous data paths and the design of an asynchronous adder", in Formal Methods in Systems Design, vol. 1(1), pp. 119–139 (1992); and Martin, "Compiling Communicating Processes into Delay-insensitive VLSI circuits", in Distributed Computing, Vol. 1(4), 1986.

Based on Martin's techniques, each input of a circuit can be encoded using a delay-insensitive (unordered) code so that the circuit can function correctly even if the inputs do not arrive at the same time. In such a code, the value of the input changes from a neutral value to a valid value without any intermediate values that are valid. Different valid values are used to encode different inputs. Functions u( ) and n( ) are used to denote the validity and neutrality of the code. $C\uparrow$ is the concurrent assignment of some bits of C such that the result is an appropriate valid value without any intermediate value being valid, and $C\downarrow$ is the concurrent assignment of some bits of C such that the result is a neutral value without any intermediate value being neutral. The exact nature of these operations depends on the encoding scheme and operation $\otimes$.

According to the handshaking protocols for prefix operations, a prefix computation is initiated by the environment by setting the inputs to some valid value. The environment then waits for the outputs to become valid, after which the inputs are reset to a neutral value. The subsequent input is supplied after the outputs are reset to a neutral value. The processes of UP2, LEAF, and ROOT can be expressed with the handshaking protocol for a quasi-delay-insensitive asynchronous circuit:

$$UP2(A, B, C, D) \equiv *[[v(A) \wedge v(B)]; C\uparrow, D\uparrow; [n(A) \wedge n(B)]; C\downarrow, D\downarrow] \quad (9)$$

$$LEAF(X, U, V, Y) \equiv *[[v(L)]; U\uparrow, C\uparrow; [n(L)]; U\downarrow, C\downarrow] \quad (10)$$
$$\| *[[v(C) \wedge v(V)]; Y\uparrow; [n(C) \wedge n(V)]; Y\downarrow]$$

$$ROOT(L, R, Ld, Rd) \equiv \quad (11)$$
$$*[[v(L) \wedge v(R)]; Ld\uparrow, Rd\uparrow; [n(L) \wedge n(R)]; Ld\downarrow, Rd\downarrow]$$

One limitation of the above handshaking protocol is that the tree only performs one prefix computation at a time since the circuit needs to wait for the output to become valid before resetting the input. A pipelined operation having simultaneous operations on multiple inputs is difficult to implement.

One prior-art system for pipelining operations is to introduce an additional acknowledge signal for each input and output. With this signal, the environment is able to reset the inputs after receiving an acknowledgment from the circuit and can send the next input after the acknowledgment signal has been reset. Thus, the circuit does not need to wait for the output to become valid. In this scheme, UP2, LEAF, and ROOT can be rewritten with the handshaking protocol as:

$$UP2(A, B, C, D) \equiv \quad (12)$$
$$*[[\neg Ca \wedge \neg Da \wedge v(A) \wedge v(B)]; C\uparrow, D\uparrow, Aa\uparrow, Ba\uparrow;$$
$$[Ca \wedge Da \wedge n(A) \wedge n(B)]; C\downarrow, D\downarrow, Aa\downarrow, Ba\downarrow$$
$$]$$

$$LEAF(X, U, V, Y) \equiv \quad (13)$$
$$*[[\neg Ua \wedge \neg Ca \wedge v(L)]; U\uparrow, C\uparrow, La\uparrow;$$
$$[Ua \wedge Ca \wedge n(L)]; U\downarrow, C\downarrow, La\downarrow]$$
$$\| *[[\neg Ya \wedge v(C) \wedge v(V)]; Y\uparrow, Ca\uparrow, Va\uparrow;$$
$$[Ya \wedge n(C) \wedge n(V)]; Y\downarrow, Ca\downarrow, Va\downarrow]$$

$$ROOT(L, R, Ld, Rd) \equiv \quad (14)$$
$$*[[\neg Lda \wedge \neg Rda \wedge v(L) \wedge v(R)]; Ld\uparrow, Rd\uparrow, La\uparrow, Ra\uparrow;$$
$$[Lda \wedge Rda \wedge n(L) \wedge n(R)]; Ld\downarrow, Rd\downarrow, La\downarrow, Ra\downarrow$$
$$]$$

wherein ¬ represents negation and the signals labeled with "a" are the acknowledgment signals for the channels. Of course, other implementations of a pipelined operation are also possible.

Buffering on a channel connecting two halves of UP (and LEAF) is needed for the prefix operation tree to allow for simultaneously performing pipelined O(log N) operations. The buffering is proportional to the depth of the node in the tree. FIG. 2a "unfolds" the prefix operation tree of FIG. 1b to illustrate the up-going phase and the down-going phase. The vertical arrows indicate the internal channels C. For a node of d steps away from the root, (2d–1) stages of buffering on the internal channel C are needed to allow (2 log N+1) simultaneous prefix operations. FIG. 2b shows the tree with the appropriate buffers.

The throughput, which is the number of operations per second, of the pipelined prefix computation with buffers, depends on the time to perform the $\otimes$ operation rather than the number of inputs. The time for the output to be produced when the pipeline is empty is the latency of the computation block which is proportional to the number of stages. Therefore, the latency of the prefix operation tree is (2 log N+1) both with or without the buffers.

Another prior-art technique for performing the prefix operation is illustrated by a circuit in FIG. 3. This circuit performs the prefix operation in a bit-serial manner. For N different input channels, N processing stages are used with one stage for each input channel. All processing stages are linearly connected with one another. A stage for $x_k$ receives $y_{k-1}$ on channel L from the previous stage for $x_{k-1}$ and kth input parameter $x_k$ on channel $X_k$ therein. The stage for $x_k$ operates to produce output $y_k$ on both channel $Y_k$ and a channel R that connects to the next stage. This prefix operation can be expressed in a communication hardware process by:

$$SERIAL(X, Y, L, R) = *[X?x, L?p; Y!(p \otimes x), R!(p \otimes x)]. \quad (15)$$

The above linear operation has a latency of O(N) which is worse than the previously-described prefix operation tree method.

The latency of the serial prefix computation may be improved by employing a special property of the operation ⊗ so that the outputs on channels Y and R can be produced before the input on the channel L is received. This reduces the latency down to O(log N) on average, the same as the latency of the prefix operation tree.

For example, the operator ⊗ has a property x⊗a=b for all values of x. If the input on the channel X is a, then the outputs on Y and R are equal to b, which can be produced without input on channel L. Thus, the SERIAL process can be written as follows:

$$SERIAL(X, Y, L, R) \equiv \qquad (16)$$
$$*[X?x;[x = a \rightarrow Y!b, R!b, L?c$$
$$[] x \neq a \rightarrow L?c; Y!(c \otimes x), R!(c \otimes x)$$
$$]$$
$$]$$

Where ⇑ represents waiting until one of the guards separated thereby becomes true and then executing the statements indicated by the arrow associated with the true guard. The time for this process to produce the output is data-dependent. In the best case, the time from receiving the inputs to producing the output is constant, much better than the prefix computation tree. In the worst case, the time is O(N), much slower than the latency of O(log N) of the prefix computation tree. However on average, the latency of the operations is o(log N) as is known in the art.

SUMMARY OF THE INVENTION

As described above, the average-case latency of the prior-art systems is O(log N). The present invention improves the performance of the prefix operation by using a new asynchronous circuit. The present disclosure describes a method and a circuit for performing prefix operations with an asynchronous circuit to exploit the average case behavior.

A prefix computation system of the invention may include two or more prefix computation circuits having different circuit latencies. The circuits are interconnected in parallel with each other to simultaneously perform a prefix computation with respect one another based on the same input data. Communication channels are implemented to allow for data exchange between any two prefix computation circuits. An intermediate stage in a circuit may perform a desired operation for that circuit based on computation results generated by other parallel circuits. Preferably, a circuit chooses a desired result from another circuit which generates that result the earliest. Such a system achieves an average-case latency better than the parallel prefix circuits being used in it.

In one embodiment of the present invention, a circuit for performing the prefix operation has attributes of both the prefix computation tree process and the serial prefix computation process. Specifically, the prefix computation tree process and the serial prefix computation process are combined in a special way so that the tree operation and the serial operation compete against with each other and the circuit picks the solution that arrives first.

One advantage of the present invention is a significantly improved latency. For a N-input circuit without buffering, the circuit size is O(N) and the cycle time is O(log N). The average-case latency is O(log(log N)) with the best-case latency of O(1) and the worst-case latency of O(log N). In one aspect, by using binary-tree type buffering, the N-input circuit can be pipelined to reduce its cycle time to O(1) and to operate at full throughput with a constant response time. The buffering increases the circuit size to O(N log N).

Another aspect of the invention is that a serial phase circuit of the prefix computation may be implemented only at one level of the tree structure at a predetermined stage of the tree. For a N-input circuit, the serial phase circuit may be optimally formed at O(loglog N) steps away from the leaves of the tree while still maintaining the same average-case latency of O(loglog N). Thus, tree computation beyond O(loglog N) steps in the tree structure may be eliminated to reduce the overhead area of the circuit.

A further aspect of the invention is the optimization of the circuit size in a prefix computation circuit in accordance with the invention. For unpipelined N-input circuit, the optimal size is O(N). A full-throughput N-input circuit has an optimal size of O(N log N).

The circuit architecture in accordance with the invention can be used to construct a full-throughput binary adder of N inputs. A low latency of O(loglog N) can be achieved in such an adder.

BRIEF DESCRIPTION OF THE DRAWINGS

These and other aspects and advantages of the present invention will become more apparent in light of the following detailed description of preferred embodiments thereof, as illustrated in the accompanying drawings, in which.

DETAILED DESCRIPTION OF THE INVENTION

The following detailed description discloses a prefix computation system that implements a tree circuit and a serial circuit in parallel as an example to illustrate the invention. It should be understood that prefix computation circuits other than a tree configuration or a serial configuration may be combined to achieve an average-case latency and three or more parallel circuits may be used to practice the invention.

Figure 4A:
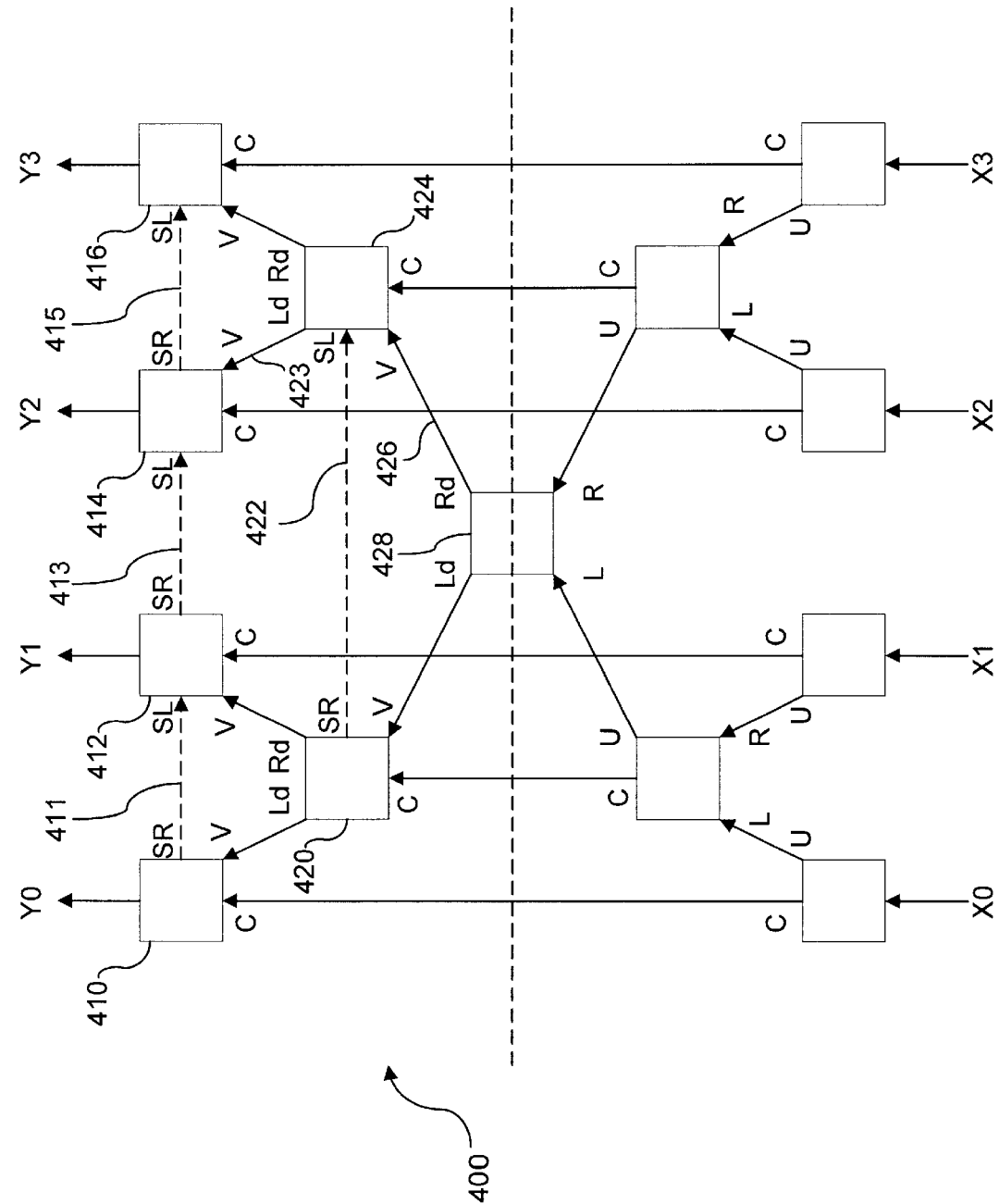
FIG. 4a is a block diagram of the preferred prefix computation circuit of the present invention.

FIG. 4a shows one preferred circuit 400 for performing the prefix operation in accordance with the invention. A special case of n=4 is shown to illustrate the key aspects of the preferred circuit.

Figure 1A:
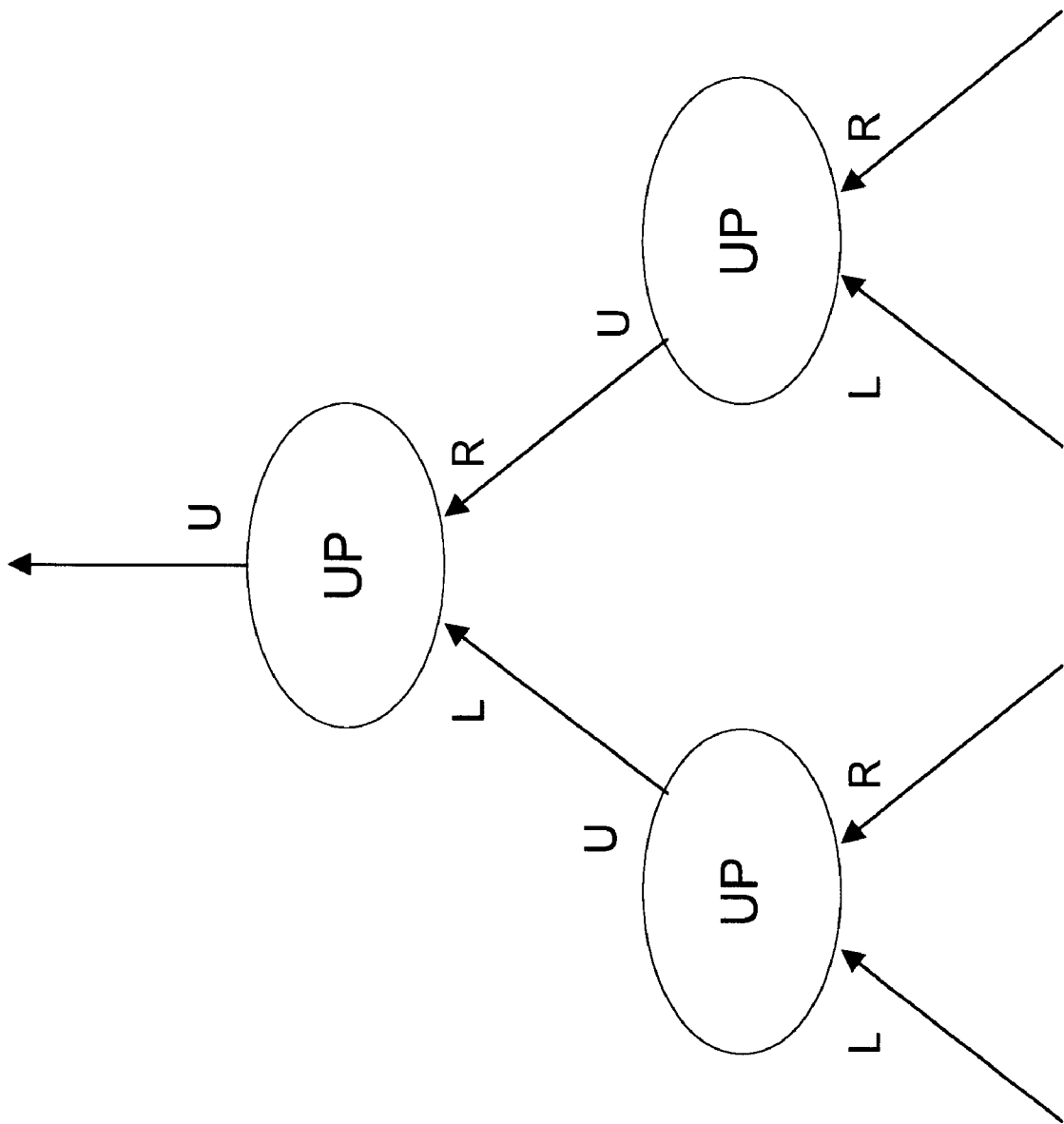
FIGS. 1a and 1b are block diagrams showing a prefix operation circuit in a tree configuration.
Figure 1B:
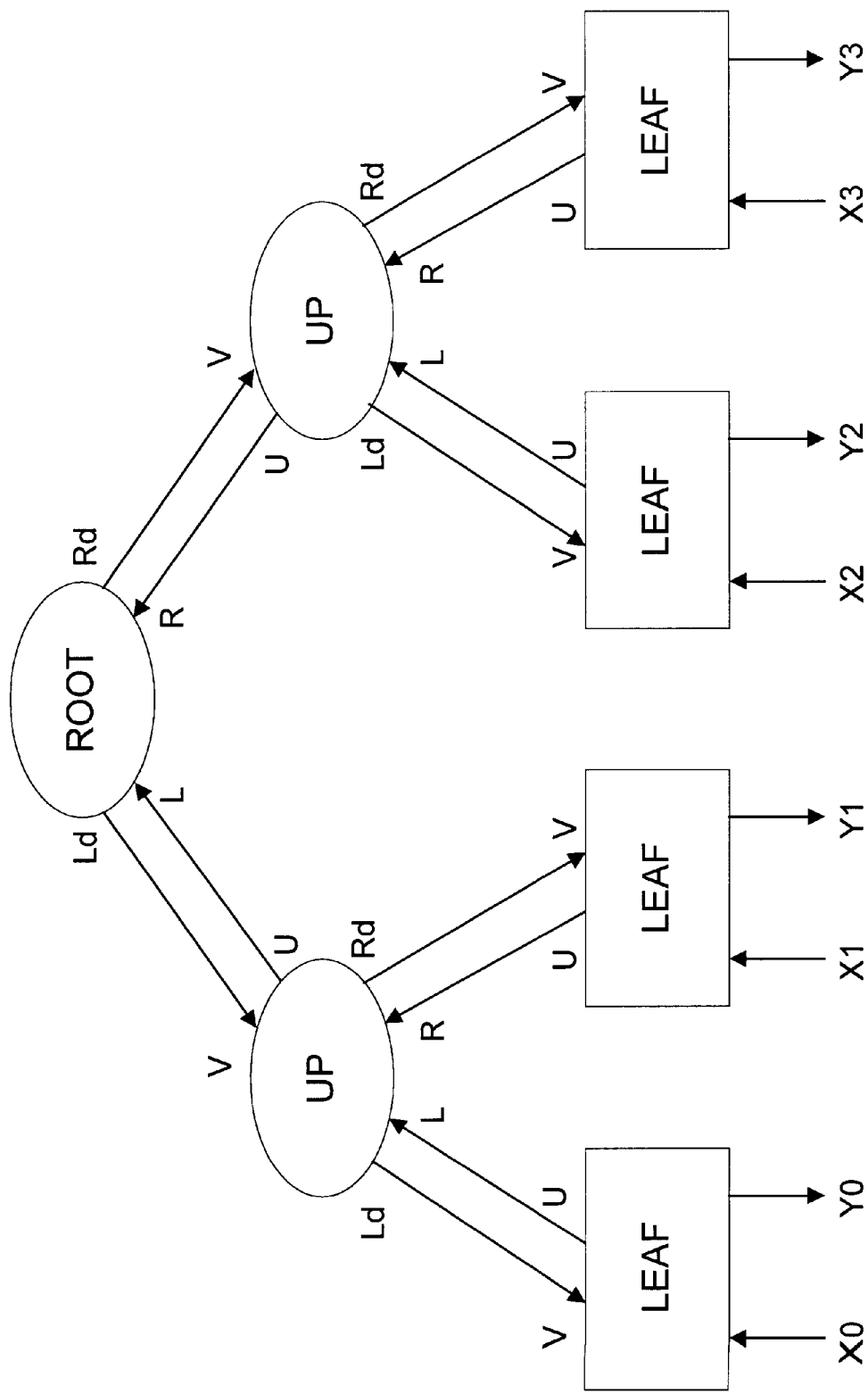
Figure 2A:
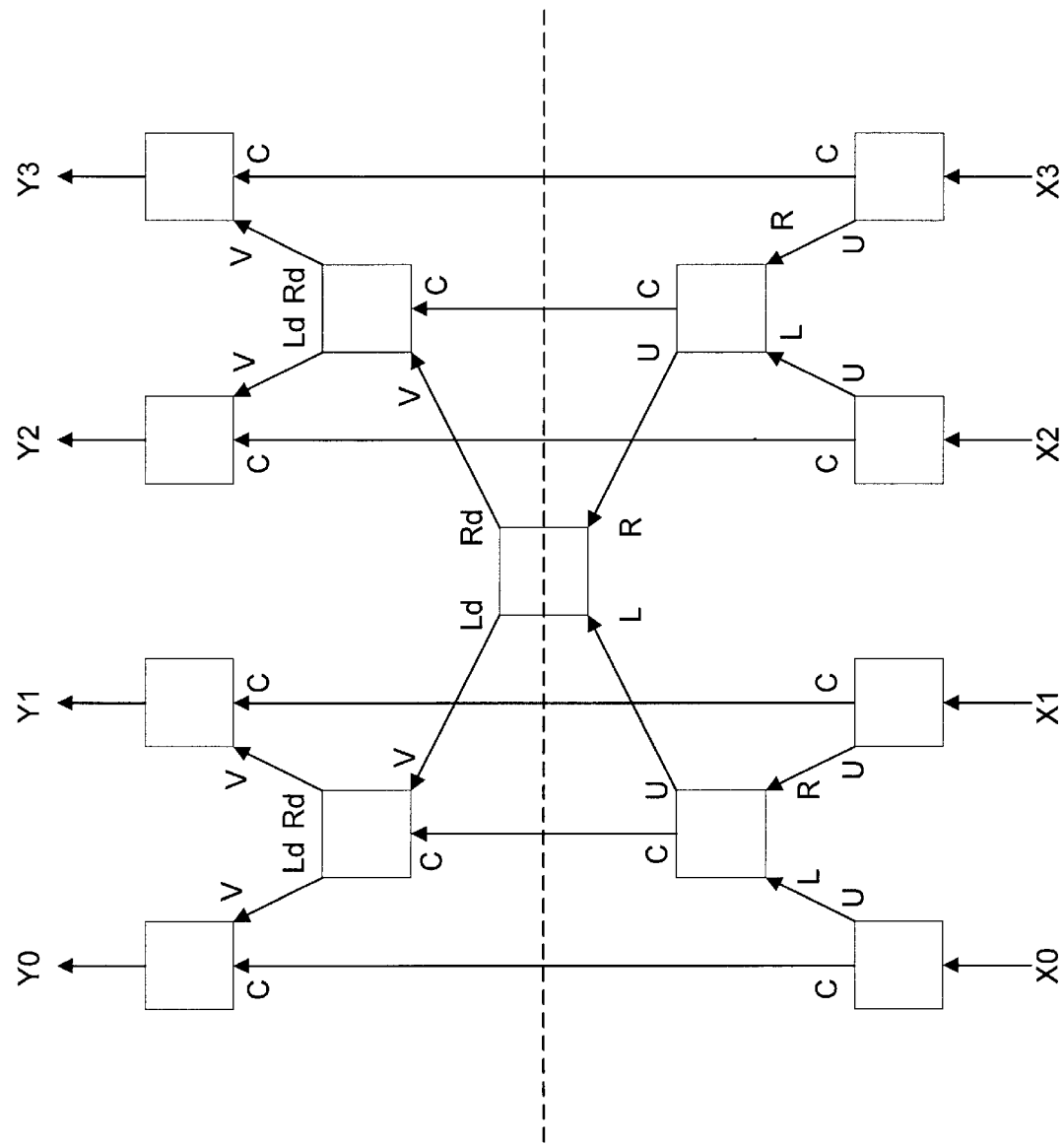
FIGS. 2a and 2b are block diagrams showing the buffering for a pipelined prefix operation.
Figure 2B:
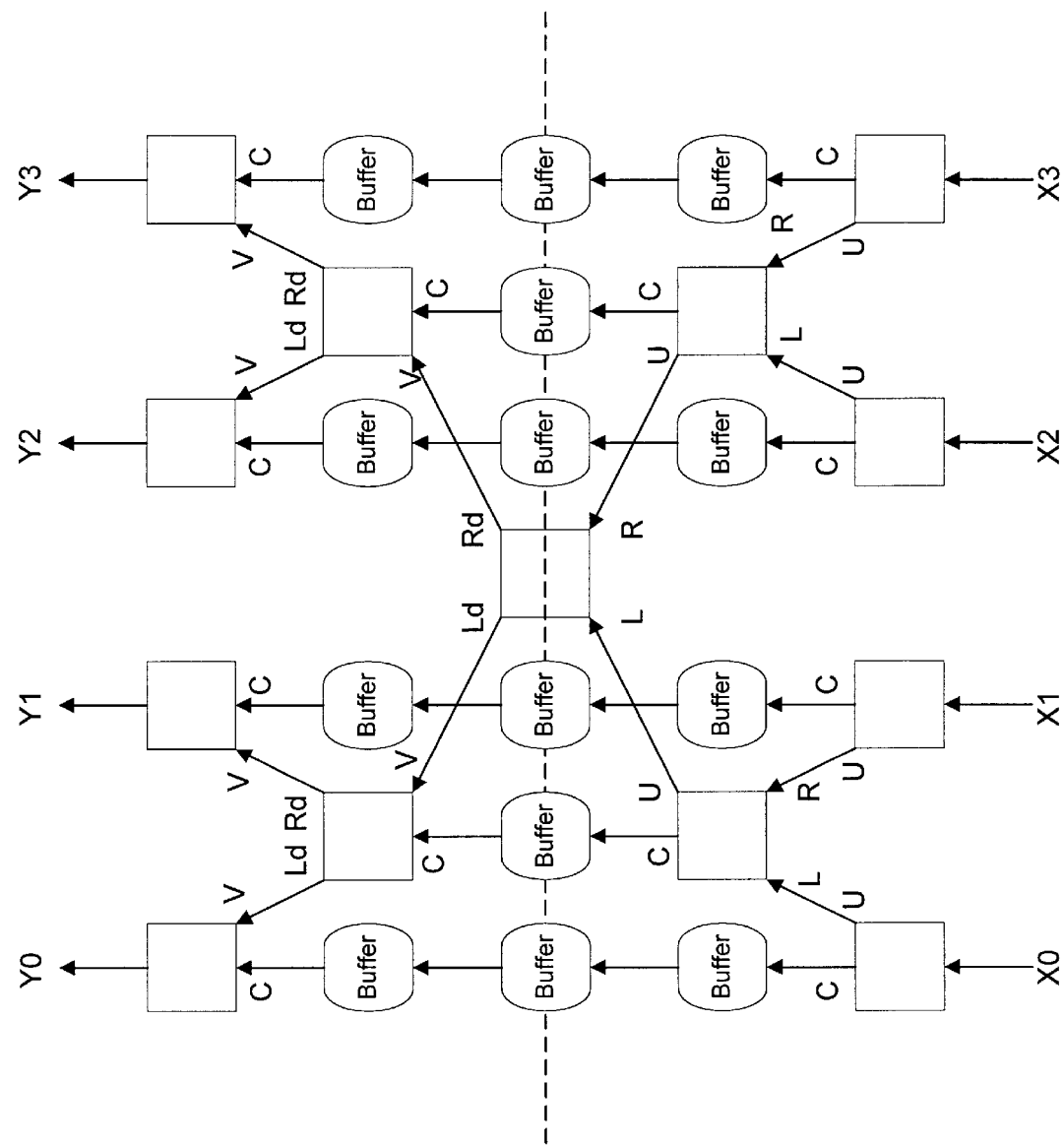
Figure 3:
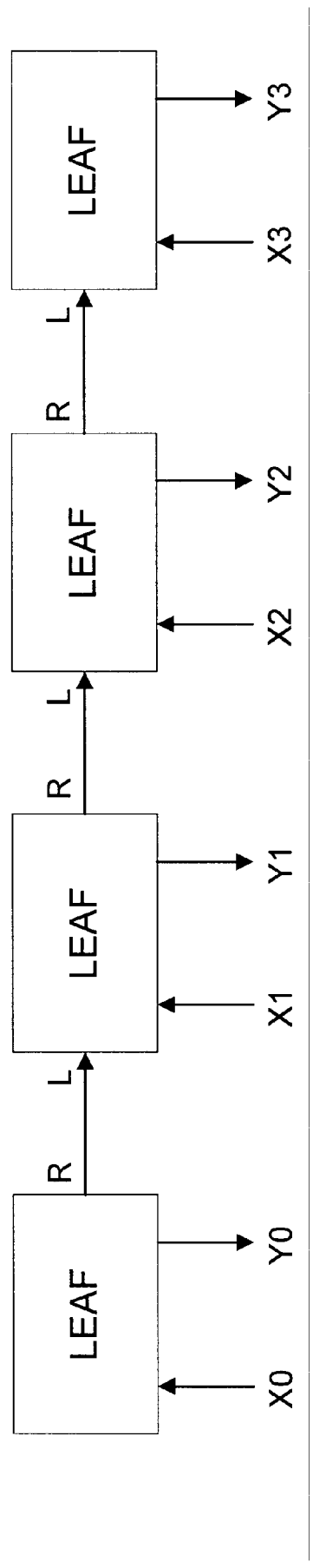
FIG. 3 illustrates a serial circuit for the prefix operation.

Specifically, the stages of the down-going phase shown by the processes above the dotted line which generate the outputs Y0, Y1, Y2, and Y3 of the tree circuit 400 have additional serial-type data channels, such as 411, 413, 415, and 422, to connect two adjacent leaves, such as 410 and 412, 412 and 414, and 414 and 416, or to connect two adjacent UP nodes such as 420 and 424. The output of the leaf on the left is fed to an input channel of an adjacent leaf on the right. Thus, the leaves and UP nodes are connect in a serial manner substantially similar to the serial circuit of FIG. 3.

Each leaf, except for the leftmost leaf 410, has three input channels, a first one, a left channel SL from a leaf on the left as a result of the serial prefix operation, a second one, channel V, from the closest leaf of the previous level in the tree as a result of the tree prefix operation, and a third one, "copy" channel C, directly from the input in the root of the up-going phase. The data from the first input channel SL and the second input channel V are identical to each other, i.e., $y_{k-1}$ for the leaf for $x_k$. The circuit 400 performs the operation $\otimes$ at each leaf by using the first-arrived $Y_{k-1}$ from either the first input channel (SL) or the second input channel (V). For example, the leaf 414 will use the first-arrived data from either channel V (423) from the UP node 424 or channel SL (413) from the leaf 412 to produce the outputs Y2 and SR (415).

Serially connected UP nodes of the tree operate in a similar manner. Thus, the UP node 424 will take the first-arrived data from either channel SL 422 produced by the UP node 420 or channel V (426) from the ROOT 428.

A merge mechanism is implemented at each leaf or UP node to merge the first and the second input channels so that the serial prefix operation and the tree prefix operation in effect compete against each other. This merge mechanism externally combines channel V and channel SL, which have the same value, into a channel M (not shown) to pick the first arrived input for producing the output:

$$\text{MERGE}(L, V, M) = *[[\overline{L} \to L?y; M!y, V?yy|V \to V?y; M!y, L?yy]] \quad (17)$$

where yy indicates a temporary variable. The LEAF operation of the circuit 400 can be written as:

$$\text{LEAF}(X, U, V, L, R, Y) = *[X?x; U!x, C!x]\|\text{MERGE}(L, V, M)\|\text{SERIAL}(C, Y, M, R) \quad (18)$$

The corresponding SERIAL process that picks the first input is given by:

$$*[[\neg Ma];[v(L) \lor v(V)]; M \Uparrow; ([v(L)]; La\uparrow), ([v(V)]; Va\uparrow); \quad (19)$$

$$[Ma]; M \Downarrow; ([n(L)]; La\downarrow), ([n(V)], Va\downarrow)$$

]

The UP process in the circuit 400 can be modified to include the ripple-carry prefix operation. The value to be sent along a right channel R for the serial computation, SR, is given by $p\otimes x\otimes y$. An additional internal channel C' may be introduced for transmitting the value of $x\otimes y$. The left channel for the serial computation, denoted by SL, is merged with the channel V using the same MERGE process given by Equation (17). The modified UP process is therefore written as:

$$\text{UP}(SL, SR, L, R, U, V, Ld, Rd) = *[L?x, R?y; U!(x\otimes y), C'!(x\otimes y), C!x]\|\text{MERGE }(SL, V, M)\|*[C?d, C?c, M?p; Ld!p, Rd!(p\otimes c), SR!(p\otimes d)]. \quad (20)$$

The serial phase should have the same form e.g. $*[c^1 ?d;$ $[d = a \to SR/b; M^1 ?yy$ $\prod [d \neq a \to M^1 ?p; SR!(p \otimes d)$

]

]

The above solution follows from the unpipelined version of the prefix computation, the cycle time is O(log N). Therefore, the circuit 400 for the prefix operation cannot run at full throughput since there is O(1) buffering between stages in the serial part of the circuit.

Figure 4B:
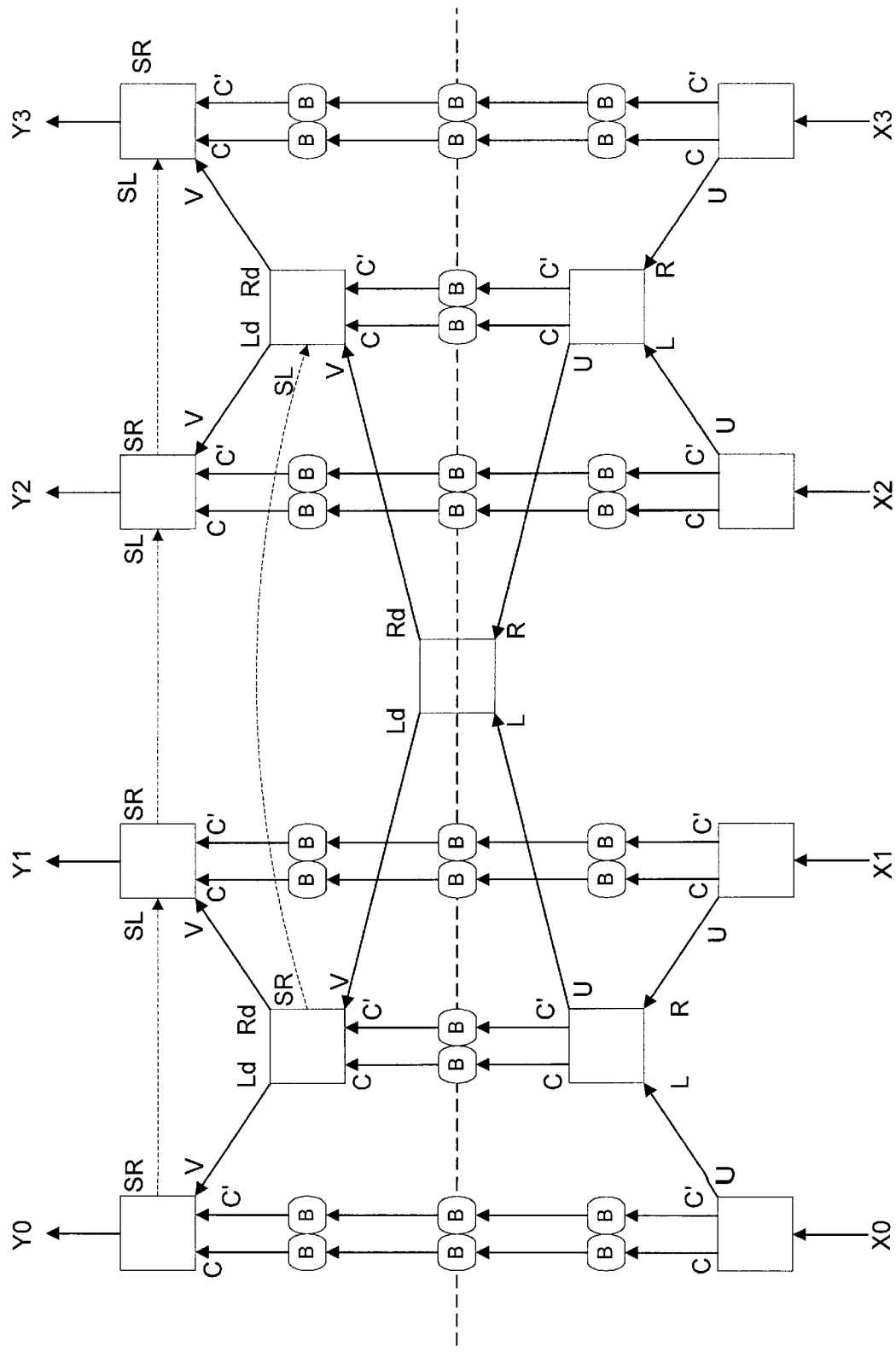
FIG. 4b is a block diagram showing the preferred circuit having buffers for simultaneous pipelined operation.

One technique to implement full throughput is to provide buffering on internal channel C for copying input x and internal channel C' for copying value $x\otimes y$. FIG. 4b shows the circuit 400 with buffers. A total of 2(2d−1) buffers in (2d−1) stages are connected between each stage of the circuit at depth d in the tree. These buffers are binary-tree type or a cache, which has (log d) latency, where d is the size of the buffer. The buffers do not increase the order of the average-case latency, i.e., the time taken for the rippling serial computation to pass through the buffers, which is O(loglog N) for both circuits shown in FIGS. 4a and 4b.

The latency L(N) of the preferred circuits with N inputs for performing the prefix operation is data-dependent. Information on the input distribution is desirable to determine the average-case latency.

Consider process SERIAL in Equation (16) which is part of the prefix computation. When $x \neq a$, the output on Y and R depends on the input c on channel L. This is called "propagate" case since the output of the process depends on the input c. Assume p is the probability of a particular input being a and this distribution be independent across all N inputs. The inventors discovered that, if the inputs remain independently distributed with non-zero probability of an input being a right zero (0$^+$), the average-case latency of the above-modified asynchronous prefix computation of size N is O(loglog N). This is still applicable even if the probability of the input being at input position I might vary as long as it is not zero since p can be chosen to be the smallest value as a conservative approximation.

The above property of the modified prefix computation circuit may be understood by the following reasoning. Assume a k-ary tree is used for the prefix operation with N inputs. The latency L(N) can be written as:

$$L(N) = \min\left(ms, L\left(\frac{N}{k}\right) + h\right) \quad (21)$$

where m is the length of the longest sequence of "propagate" inputs, s is the delay through a single stage of the serial "propagate" chain at the leaves of the tree, and h is the delay through one stage of the tree. The first part of the right-hand-side of Equation (21) comes from the serial computation, and the latter part from the tree computation.

Expansion of L(N/k) may be done by observing that m can be replaced by m/k in a subsequent stage since the input remains the same. Recursive application of this expansion leads to the following:

$$L(N) = \min_{m \geq k^i}\left(\frac{ms}{k^i} + ih\right) \quad (22)$$

In particular, an upper limit of L(N) can be obtained by setting $m = k^i$:

$$L(N) \leq s + \frac{h}{\log k}\log m, \quad (23)$$

and the average latency is bounded by an upper limit given by:

$$\langle L(N) \rangle \leq s + \frac{h}{\log k}\langle \log m \rangle \quad (24)$$

-continued $$\leq s + \frac{h}{\log k} \log \langle m \rangle,$$

since $\langle \log m \rangle \leq \log \langle m \rangle$.

It can be shown that $$\langle m \rangle \leq \lceil \log_{1/(1-p)} N \rceil + \frac{1}{Np} = O(\log N), \quad (25)$$

for $0 < p < 1$. Therefore, the average latency through the prefix computation is bounded by $$\langle L(N) \rangle \leq s + \frac{h}{\log k} \log \left( \lceil \log_{1/(1-p)} N \rceil + \frac{1}{Np} \right) = O(\log \log N). \quad (26)$$

When the prefix computation circuit of FIG. 4b operates with O(1) cycle time, the value of s given above is a function of N. Since the serial computation part is also added with (2d−1) stages of buffering at depth d in the tree, i.e., channel C', the value of s is upper-bounded by a function that depends on the latency of a buffer of size O(log N). The choice of binary buffer for the internal channels C and C' makes the latency of a buffer of size O(log N) is O(loglog N). Therefore, the additional buffering required to reduce the cycle time of circuit of FIG. 4b does not increase the order of the average-case latency.

The circuit having an average-case latency of O(loglog N) has O(N log N) additional circuit size because of the additional buffering required. The inventors further discovered, however, that the overhead area in the circuit of FIG. 4b can be reduced while still maintaining the same average-case latency.

This may become more clear by analyzing the average-case latency of O(loglog N) in the circuit of FIG. 4b. It is assumed that the serial part of the computation is not used. For example, a series of operations can performed by moving up in the tree by O(loglog N) steps. Next, we use the serial phase. At this depth the average case propagation chain length is O(1), so we complete this equation in O(1) times on average. Thus, the average propagate-chain length is O(1). Next, the prefix computation is completed by propagating the results down the tree by O(loglog N) steps. The latency of the above process is O(loglog N) steps.

Now it is assumed that the serial phase of the computation at only one level of the prefix computation tree that is d steps away from the leaves of the tree. The latency is given by:

$$L(N) = \min \left( d \cdot h + \frac{ms}{k^d}, h \log_k N \right). \quad (27)$$

On average, the latency would be:

$$\langle L(N) \rangle = \min \left( d \cdot h + \frac{\langle m \rangle s}{k^d}, h \log_k N \right) \quad (28)$$

$$= \min \left( d \cdot h + \frac{s}{k^d} \log_{\frac{1}{1-p}} N, h \log_k N \right).$$

$\langle L(N) \rangle$ reaches its minimum value for $d_{min}$ at:

$$d_{min} = \log_k \left( \frac{s}{h} \cdot \ln k \cdot \log_{\frac{1}{1-p}} N \right) \quad (29)$$

-continued $$= O(\log \log N).$$

If a serial phase prefix computation is added to a stage of $d_{min}$ steps deep, the average-case latency is:

$$L_{min}(N) = \frac{h}{\ln k} + \log_k \left( \frac{s}{h} \cdot \ln k \cdot \log_{\frac{1}{1-p}} N \right) \quad (30)$$

$$= O(\log \log N).$$

Notice that the circuit has a total of O(N/Log N) nodes by adding a serial phase of $d_{min}$ steps away from the leaves and with O(log(N/Log N)) buffering for each node. Therefore, tree computation beyond steps $d_{min}$ can be eliminated while the same average-case latency of O(loglog N) is maintained. This architecture reduces the circuit area overhead by about O(N) in size.

The trade-off is an increase in the worst-case latency to O(N/log N) from O(log N). This usually is acceptable in many practical applications.

Moreover, it can be shown that the circuits shown in FIGS. 4a and 4b for prefix computations in accordance with the invention have an asymptotically optimal circuit size.

This is valid for prefix computation circuits that can be repeatedly used, that do not store information about its operation history, and that require the knowledge of $x_k$ to produce an output $y_k$. Two facts on a general prefix computation circuit may be used to show that the circuit size in accordance with the present invention is optimized. First, the size of a N-input prefix computation circuit is O(N max(1, r(N)), where r(N) is the worst-case ratio of its latency and cycle time. Second, an N-input parallel prefix computation circuit has a latency of O(log N).

Therefore, an unpipelined N-input prefix computation circuit (e.g., FIG. 4a) has an optimized circuit size of O(N) and a pipelined N-input circuit (e.g., FIG. 4b) has an optimized circuit size of O(N log N).

One of applications for a prefix computation circuit is construction of a binary kpg-adder. This is described by Ladner and Fischer, supra. Binary addition at a bit position requires knowledge of a corresponding carry-in for that bit position. This carry-in computation can be performed as a prefix computation as follows.

Consider a situation in which the two inputs at a bit position are both zero. The carry-out of the stage is zero, i.e., a "kill" ("k"), no matter what the carry-in is. Conversely, if the two inputs at a bit position are both one, the carry-out is always one, i.e., a "generate" ("g"). For any other cases in which one of the inputs is one and the other is zero, the stage will propagate ("p") the carry-in. To determine the carry-out of two adjacent stages, a prefix computation can be formulated. This prefix computation may be represented by the above properties of the carry-out and carry-in in form of the kpg codes.

Table 1 shows a kpg table for a binary adder. The vertical column represents the kpg code for the least significant bit. The kpg code shows that x⊗k=k and x⊗g=g for any x (i.e., k, p, and g). This is a desired property for reducing the latency in a serial prefix computation. Therefore, the prefix computation circuits in FIGS. 4a and 4b can be used as a kpg-adder to reduce the latency. As shown in the foregoing, such a pipelined binary adder of N inputs has an average-case latency of O(loglog N), a cycle time O(1), and a circuit size of O(N log N). The worst-case latency is O(log N).

TABLE 1

| kpg code for binary addition | | | |
|---|---|---|---|
| ⓧ | k | p | g |
| k | k | k | g |
| p | k | p | g |
| g | k | g | g |

A microprocessor performs a binary addition by simultaneously executing two processes in parallel: computing the carry-out of each bit position and computing the actual addition. The process for carry-out is done with the prefix computation by using the kpg code. The microprocessor then combines the output results of the two parallel processes to generate the final output.

Although the present invention has been described in detail with reference to several embodiments with a certain degree of particularity and specificity, one ordinarily skilled in the art to which this invention pertains will appreciate that various modifications and enhancements may be made without departing from the spirit and scope of the following claims.

What is claimed is:

1. An asynchronous circuit for performing a prefix computation, comprising:
    a first prefix computation circuit having a plurality of input terminals to receive input data and a first circuit configuration to perform prefix computation based on said input data with a first latency, without a synchronizing clock signal;
    a second prefix computation circuit interconnected with said first prefix computation circuit and configured to have a second circuit configuration different from said first circuit configuration and to perform the prefix computation at least partly in parallel with said first prefix computation circuit based on said input data with a second latency, without a synchronizing click signal;
    at least one data link interconnecting said first and second prefix computation circuits to provide data exchange therebetween and to produce an averaged latency of O(loglogN) in completing the prefix computation, where N is the number of said inputs, wherein each prefix computation is carried out based on first-generated results from any of said first and second circuits, without an external control signal.

2. A circuit as in claim 1, wherein:
    said first prefix computation circuit has an asynchronous pipelined tree configuration having a plurality of levels with respect to the input terminals, each having a plurality of processing blocks; and
    said second prefix computation circuit has an asynchronous serial configuration and connects all processing blocks in at least one level of said first prefix computation circuit.

3. A circuit as in claim 2, wherein said second prefix computation circuit is connected to said first prefix computation circuit at a selected level having a depth from the input terminals at least equal to a minimum depth to maintain said averaged latency at O(loglogN).

4. A circuit as in claim 3, wherein said selected level is a maximum level of said asynchronous pipelined tree configuration of said first prefix computation circuit.

5. A circuit as in claim 4, wherein said minimum depth is equal to O(loglogN).

6. A circuit as in claim 1, wherein said first prefix computation circuit has an asynchronous pipelined tree configuration having a plurality of levels with respect to the input terminals, and second prefix computation circuit has an asynchronous serial configuration, and further comprising buffers connected between different levels of said first prefix computation circuit and configured to provide a full-throughput operation.

7. A circuit as in claim 1, wherein each of said first and second prefix computation circuits operate according to a delay-insensitive communication protocol.

8. A circuit as in claim 1, wherein said first and second prefix computation circuits are interconnected to share processing components.

9. A circuit as in claim 1, wherein each prefix computation circuit includes a buffer between two adjacent processing stages to improve the throughput.

10. The circuit as in claim 9, wherein said buffer has an logarithmic latency of (log d), where d is the size of said buffer.

11. The circuit as in claim 9, wherein said buffer is either a binary-tree type of buffer or a cache.

12. A method of performing a prefix computation, comprising:
    providing a circuit having at least first and second computation mechanisms which are operable to perform the prefix computation in parallel and without synchronizing to each other;
    performing the prefix computation with the first computation mechanism based on a set of input signals without a synchronizing clock signal;
    simultaneously performing the prefix computation with the second mechanism base on the input signals without a synchronizing clock signal; and
    selecting a first-generated result from any of the first and second mechanism, without an external control signal, to achieve an average-case latency O(log log N) of the first and second mechanism, where N is the number of inputs.

13. A method as in claim 12, wherein said first computation mechanism has an asynchronous pipelined tree configuration of a plurality of levels each having a plurality of processing blocks and said second computation mechanism has an asynchronous serial configuration to connect all processing blocks in at least one level of said first prefix computation circuit.

14. A method as in claim 13, wherein each of said asynchronous pipelined tree configuration and said asynchronous serial configuration includes a buffer of a predetermined size between two adjacent processing stages, whereby to improve the throughput.

15. An asynchronous circuit, comprising: a first set of processing blocks connected with one another in series to form a serial processing circuit and configurated to operate on a plurality of input signals to produce an output with a first latency, wherein each processing block communicates with another processing block without synchronizing to a clock signal; and
    a second set of processing blocks connected with one another and with said first set of processing blocks to form a pipelined processing tree circuits with at least two levels, said pipelined processing tree circuit operable to process said input signals and to produce said output with a second latency, wherein said second set of processing blocks communicate with one another and said first set of processing blocks without synchronizing to a clock signal,
    wherein at least one processing block in each of said serial processing circuit and said pipelined processing tree circuit has a first input to receive a signal from another processing block in said serial processing circuit and a second input to receive the same signal from one processing block of said pipelined processing tree circuit, said at least one processing block operable to use one of said first and second inputs that first produces said signal to produce an output, without relying on a control signal, wherein all processing blocks in at least one level of said pipelined tree circuit are connected by said serial processing circuit so as to produce an average latency of O(log log N), where N is the number of inputs.

16. The circuit as in claim 15, wherein processing blocks in either said serial processing circuit or said pipelined processing tree circuit are configured to communicate with one another according to a delay-insensitive protocol.

17. The circuit as in claim 15, wherein each of said serial processing circuit and said pipelined processing tree circuit includes s buffer between two adjacent processing blocks to improve throughput.

18. The circuit as in claim 17, wherein said buffer has a logarithmic latency of (log d), where d is the size of said buffer.

19. The circuit as in claim 17, wherein said buffer is either a binary-tree type of buffer or a cache.

20. A circuit as in claim 15, wherein said serial processing circuit is connected to said tree processing circuit at a selected level having a depth at least equal to a minimum depth to maintain said averaged latency at O(loglogN).

21. A circuit as in claim 20, wherein said selected level is a maximum level of said tree processing circuit.

22. A circuit as in claim 21, wherein said minimum depth is equal to O(loglogN).

23. An asynchronous circuit, comprising:
a plurality of input terminals to receive input signals;
a plurality of processing blocks connected with one another to form a tree processing circuit with at least two levels a with respect to said input terminals, said tree processing circuits operable to process said input signals and to produce an output with a first latency, wherein said processing blocks are interconnected in a way to communicate with one another without synchronization to a clock signal; and
a plurality of communication channels to connect all processing blocks in at least one level of said tree processing circuit to form a serial processing circuit which operates without synchronization to a clock signal and has a second latency, wherein at least one processing block in said serial processing circuit has a first input to receive a signal from another processing block in said serial processing circuit and a second input to receive the same signal from one processing block of another level of said tree processing circuit, said at least one processing block operable to use one of said first and second inputs that first produces said signal to produce an output, wherein said tree processing circuit and said serial processing circuit operate in combination to produce an average latency of O(log log N), where N is the number of inputs.

24. A circuit as in claim 23, further comprising buffers connected between two adjacent levels of said tree processing circuit to provide a full-throughput operation.

25. A circuit as in claim 23, wherein said at least one level which forms said serial processing circuit has a depth at least equal to a minimum depth to maintain said averaged latency at O(loglogN).

26. A circuit as in claim 25, wherein said minimum depth is equal to O(loglogN).

27. A circuit as in claim 23, wherein said at least one level is a maximum level of said tree processing circuit.

28. A circuit as in claim 23, wherein both said tree processing circuit and said serial processing circuit operate according to a delay-insensitive communication protocol.

29. A method for processing input signal in an asynchronous manner, comprising:
connecting a plurality of processing blocks to form a tree processing circuit which has at least two levels and operates without synchronization to a clock signal;
processing the input signals by using the tree circuit to produce an output with a first latency;
connecting all processing blocks in at least one level of the tree processing circuit to form a serial processing circuit which operates without synchronization to a clock signal and has a second latency;
in at least one processing block in said serial processing circuit, selecting a first-generated signal between a signal from another processing block in said serial processing circuit and the same signal generated from another level of said tree processing circuit, to produce an output; and
combining said tree processing circuit and said serial processing circuit to produce an average latency of O(log log N), where N is the number of inputs.

* * * * *

UNITED STATES PATENT AND TRADEMARK OFFICE
CERTIFICATE OF CORRECTION

PATENT NO. : 5,999,961
DATED : DECEMBER 7, 1999
INVENTOR(S) : RAJIT MANOHAR AND ALAIN J. MARTIN

It is certified that error appears in the above-identified patent and that said Letters Patent is hereby corrected as shown below:

Column 1, line 5

Government Contract Notice: Please include a Federal Support Statement. Applicants herewith notify the Patent Office that the above-referenced patent may have received funding under U.S. Government Grant No. N00014-87-K-0745 awarded by the NAVY.

Signed and Sealed this

Twelfth Day of September, 2000

Attest:

Q. TODD DICKINSON

*Attesting Officer*     *Director of Patents and Trademarks*